United States Patent
Johansson (10) Patent No.: US 7,161,278 B2
(45) Date of Patent: Jan. 9, 2007

(54) PERISTALTIC ELECTROMECHANICAL ACTUATOR

(75) Inventor: Stefan Johansson, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 179 days.

(21) Appl. No.: 10/697,290

(22) Filed: Oct. 31, 2003

(65) Prior Publication Data
US 2005/0093400 A1  May 5, 2005

(51) Int. Cl.
*H02N 2/00* (2006.01)
(52) U.S. Cl. ............... 310/328; 310/311; 310/323.02
(58) Field of Classification Search .......... 310/311, 310/323.01–323.04, 328, 366
See application file for complete search history.

(56) References Cited

U.S. PATENT DOCUMENTS

| | | | |
|---|---|---|---|
| 3,389,274 A | 6/1968 | Robertson | |
| 3,902,084 A | 8/1975 | May, Jr. | |
| 4,504,760 A | 3/1985 | Yamamoto et al. | |
| 5,283,497 A * | 2/1994 | Culp | 310/328 |
| 5,751,090 A | 5/1998 | Henderson | |
| 6,074,178 A * | 6/2000 | Bishop et al. | 417/322 |
| 6,337,532 B1 | 1/2002 | Johansson et al. | |
| 6,437,485 B1 | 8/2002 | Johansson | |
| 6,617,759 B1 * | 9/2003 | Zumeris et al. | 310/323.17 |
| 6,664,711 B1 * | 12/2003 | Baudendistel | 310/323.02 |
| 6,977,461 B1 * | 12/2005 | Hendriks et al. | 310/328 |
| 7,026,746 B1 * | 4/2006 | Audren et al. | 310/328 |

FOREIGN PATENT DOCUMENTS

JP          5146175          6/1993

OTHER PUBLICATIONS

M. Bexell et al., "Fabrication and Evaluation of a Piezoelectric Miniature Motor," Sensors and Actuators, V. 75, 1999, pp. 8-16.
Kim, Won-jong et al.: "Extended-Range Linear Magnetostrictive Motor with Double-Sided Three-Phase Stators", Conference Record of the 1999 IEEE Industry Applications Conference, vol. 2, pp. 1215-1222, 0-7803-5589-X.

* cited by examiner

*Primary Examiner*—Thomas M. Dougherty
(74) *Attorney, Agent, or Firm*—Young & Thompson (57) ABSTRACT

A peristaltic actuating element (30) is arranged against a body (20). The peristaltic actuating element (30) comprises volumes (34A–G) of electromechanical material and is arranged for selectively causing a dimension change in a main motion direction (90) of the peristaltic actuating element (30) within a limited peristaltic section (40). By changing voltage signals activating the volumes (34A–G), the peristaltic section (40) is caused to move along the peristaltic actuating element (30). The body (20) interacting with the peristaltic actuating element is thereby displaced relative to the peristaltic actuating element (30). Preferably, the length of the peristaltic section (40) is less than half the length of the entire peristaltic actuating element (30), more preferably much less. It is also preferred, if the peristaltic actuating element (30) is arranged so that the surface (32) interacting with the body (20) is removed therefrom within the peristaltic section (40).

23 Claims, 6 Drawing Sheets

PERISTALTIC ELECTROMECHANICAL ACTUATOR

TECHNICAL FIELD

The present invention relates to electromechanical actuators.

BACKGROUND

There is a great need for simple miniaturized long-stroke actuators with a high force capacity. The actuators should preferably be possible to drive for several days with a portable voltage source and in several cases the positioning accuracy has to be high. There are at most a few, if any, actuator types that come close to these demands and the few suggestions that might fulfil more than a few of these demands are far too complex and costly to be commercially feasible.

The request of low power consumption demands a well-designed component. There exist only two major low-power long-stroke (more than some 100% strain) actuator types in prior art. One is the traditional electromagnetic motor, e.g. a miniature DC motor, and the other is the mechanically resonant ultrasonic motor. The largest drawback with the DC motor is that it is not very suitable for miniaturization. Consequently, the price for a DC motor will become high when miniaturized. Furthermore, the delivered speed and momentum of a miniaturized DC motor are also not perfectly matched with general requirements in small applications and the production cost increases strongly when e.g. small gearboxes are needed.

The general resonant ultrasonic motor reaches a high efficiency, however, typically within a small frequency interval. Several factors such as quality of drive electronics, temperature and wear will furthermore make the properties of the motor deteriorate or at least change in an uncontrolled manner. The frequency interval depends intimately on the sizes and shapes of the driving elements. When using small driving elements, the operation frequency will generally be extremely high and any tolerances will influence the operation even more. Furthermore, linear motion is difficult to achieve by resonant motors, since the wave propagation conditions at the ends of the elements/body to be moved are very difficult to control or predict. Normally a mechanical resonance operates well for rotating motors, while the reflected wave at the ends of a linear motor makes this a less attractive solution. Therefore, there are no examples of prior-art miniaturized linear ultrasonic motors with the desired performance, particularly when the drive electronics has to be a part of the portable device.

The use of electromechanically active materials has previously been demonstrated to yield high forces in relation to the actuator volume, see e.g. M. Bexell and S. Johansson, "Fabrication and evaluation of a piezoelectric miniature motor", Sensors & Actuators A75 (1999), pp. 8–16. Electromechanically active materials should therefore be interesting candidates for basing miniaturized motors on. One of the main problems is, however, to find a motion mechanism that gives a good performance in terms of efficiency and force at the same time as the construction is robust and the actuator can be manufactured in a simple way.

A preferred approach for providing a miniature motor based on electro-mechanical actuators is to carefully design the actuator so that there is a good matching between the maximum force desired and the force capacity of the material itself. The first step is typically the choice of actuator material. The higher mechanical energy density that can be reached in the material the easier will the following mechanical design be. If the energy density is intermediate it will furthermore be important to use a material with a relatively low internal energy loss per excitation cycle.

The problem with mechanical resonance, discussed above, makes it less desirable to use this phenomenon in small linear motors. Instead, one may turn to use electrical resonances. Naturally, there will always be some applications where a mechanical resonance can be used as an additional method to increase the energy efficiency.

The next step in design is to couple the mechanical deformation of the material with the motion of the component to be moved in such a way that a repetition of the actuator material deformation will add to the movement of the rotor (or corresponding linear moving component). There are several different prior-art mechanisms that have been explored for step repetition, e.g. stepping mechanisms (U.S. Pat. No. 3,902,084), walking movements (U.S. Pat. No. 6,337,532), elliptical vibrations (U.S. Pat. No. 6,437,485), and travelling wave mechanisms (U.S. Pat. No. 4,504,760).

Stepping mechanisms and walking movements are indeed very useful in fine positioning. However, there are some difficulties in achieving a high energy efficiency. Furthermore, motors in prior art have been optimized for positioning accuracy. With the known design possibilities, the stiffness will in such cases be very high. This gives a poor matching with the load and hence a reduced efficiency.

Motors based on elliptical vibrations can be designed with a higher degree of energy efficiency. Instead, the fine positioning becomes more delicate and it might be difficult to get design that is mechanically robust enough for demanding applications.

The travelling wave mechanisms utilize the phenomenon that while a mechanical wave travels in one direction, the top points of the waves, which are the points in contact with the rotor, move in the opposite direction to the wave propagation. The pressure/load orthogonal to the movement direction has to be small or moderate to keep the rotor away from the valleys of the waves. Too high load attenuates or cancels the wave mechanism. To get high speed the rotor should be in contact with only a small fraction of the surface area.

SUMMARY

An object of the present invention is to provide actuators having a high energy transfer. Another object of the present invention is to provide an actuator allowing for high-accuracy positioning. Yet another object of the present invention is to provide mechanically robust actuators. A further object of the present invention is to provide actuator arrangements allowing high energy efficiency.

The above objects are achieved by devices and methods according to the enclosed patent claims. In general words, a peristaltic actuating element with volumes of electromechanical material is arranged for selectively causing a dimension change in the main motion direction of the peristaltic actuating element within a limited peristaltic section. By changing voltage signals activating the volumes, the peristaltic section is caused to move along the peristaltic actuating element. A body interacting with the peristaltic actuating element is thereby displaced relative to the peristaltic actuating element. Preferably, the length of the peristaltic section is less than half the length of the entire peristaltic actuating element, more preferably much less. It is also preferred, if the peristaltic element is arranged so that the surface interacting with the body is removed therefrom within the peristaltic section.

The advantages with an actuator according to the present invention is that a motion principle is created exhibiting a large power transfer between actuator and the body on which the actuator actuates. The motion is very power efficient and allows furthermore for quasi-static operation. High-precision positioning can thereby be achieved. The actuator according to the present invention is also easily designed for heavy loads.

BRIEF DESCRIPTION OF THE DRAWINGS

The invention, together with further objects and advantages thereof, may best be understood by making reference to the following description taken together with the accompanying drawings, in which.

DETAILED DESCRIPTION

The active material that will be used as an example in the present detailed description is a piezoelectric material, but any other electromechanical actuator material could of course be used as well. In particular, the fast evolving polymer actuator materials are of great interest, but also other old or new electromechanical materials that change their shape with an external stimulus can be used.

First, an embodiment of an actuator according to the present invention will be illustrated and described in order to accentuate the basic ideas. A comparison with prior-art actuators will follow, for emphasizing the advantages of the present invention. Eventually, a number of different modifications and variations of embodiments of the present invention will be discussed briefly.

An embodiment of an actuator arrangement in form of an electromechanical motor 10 according to the present invention is depicted in FIGS. 1A–E. Only parts, which are of particular interest for the motion principles, are illustrated. Anyone skilled in the art realizes that parts providing mechanical support, normal forces and electronic control are omitted in order to facilitate the understanding of the basic motion principles.

Figure 1A:
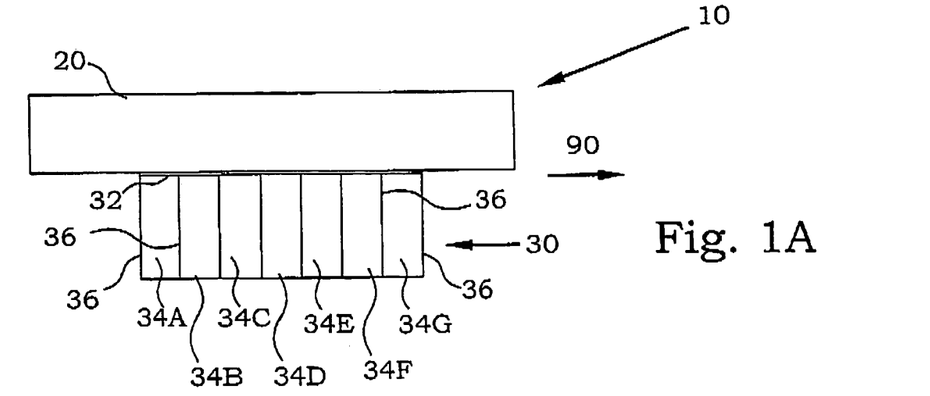
FIGS. 1A–E are schematic drawings of an embodiment of an actuator according to the present invention illustrating motion principles.

A body 20 to be moved is held against a peristaltic actuating element 30. The body 20 is intended to be moved relative to the peristaltic actuating element 30 in a main motion direction, illustrated by an arrow 90. In the present embodiment, the peristaltic actuating element 30 comprises seven volumes of electromechanical material 34A–G, in this case a piezoelectric material, typically polarized in the main motion direction. An interaction surface 32 of the peristaltic actuating element 30 is in contact with the body 20 and consists preferably of a material providing reasonable wear resistance and a suitable friction. At the ends of the peristaltic actuating element 30 as well as between each of the volumes of electromechanical material 34A–G, electrodes 36 are provided. (Only a few of them have reference numbers in FIGS. 1A–E in order to increase the figure readability.) Control means (not shown) are arranged to provide the electrodes with suitable voltage signals. In FIG. 1A, the voltage difference between electrodes is zero, and the volumes of electromechanical material 34A–G assume respective non-excited shapes.

Figure 1B:
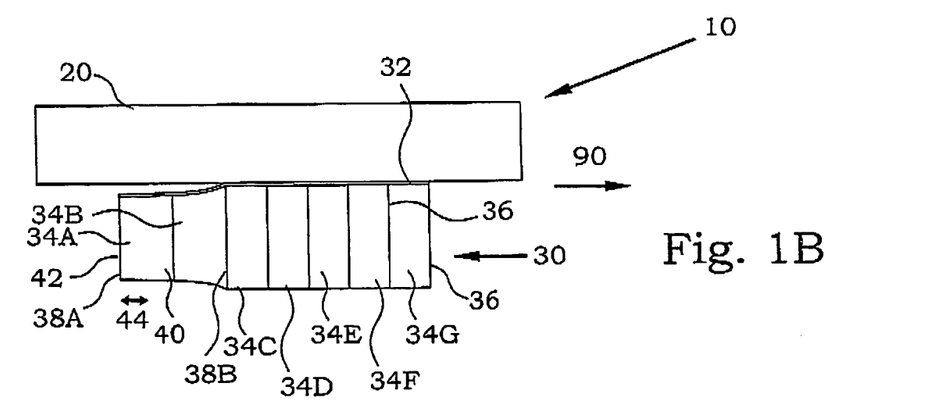

In FIG. 1B, a respective voltage has been applied over volume 34A and 34B. The volumes 34A, 34B respond by changing their shapes. Both volumes 34A, 34B increase their dimension parallel to the main motion direction 90, but reduces the dimension perpendicular to the interaction surface 32. Anyone skilled in the art realizes that the shape alterations are extremely exaggerated in these figures in order to visualize the basic concepts. In this manner, a peristaltic section 40 is created, having borders 38A and 38B, respectively. An end 42 of the peristaltic actuating element 30 will thereby be moved a distance relative to the body 20 illustrated by the double-arrow 44.

Figure 1C:
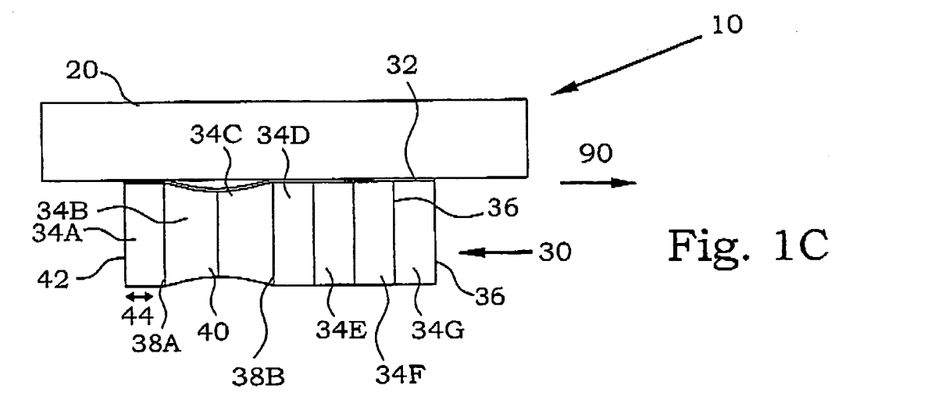
Figure 1D:
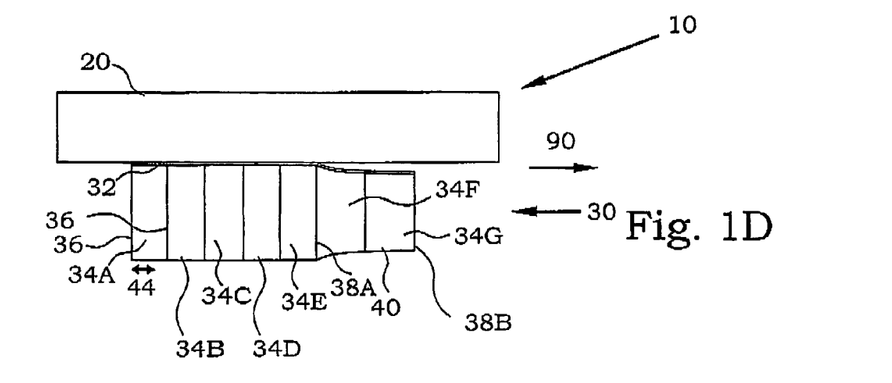

In FIG. 1C, the voltage signals to the different electrodes are changed. Now, a voltage difference is applied over volumes 34B and 34C instead. The volumes 34B and 34C expand in the main motion direction 90, and shrink perpendicular to the interaction surface 32. Instead, the volume 38A is de-excited and has regained its non-excited shape. The peristaltic section 40 now comprises the volumes 34B and 34C, and the borders 38A, 38B are moved accordingly. The total length of the peristaltic actuating element 30 is essentially the same as in FIG. 1B, since two volumes are exited in each case. Since the volume 34A now has its original shape, the interaction surface 32 portion of this volume is again in contact with the body 20. However, the relative position, compared to FIG. 1A is displaced the distance 44.

The transition from FIG. 1B to FIG. 1C is preferably performed in an essentially gradual fashion, which causes the peristaltic section 40 to move substantially continuously along the peristaltic actuating element 30. If such a gradual change in voltage signals is continued, the situation illustrated by FIG. 1D will occur at a later stage. Here, the volumes 34F and 34G are excited, exhibiting the longitudinal extension and transversal compression. The peristaltic section 40 has now reached the other end 46 of the peristaltic actuating element 30. In this situation, all parts of the interaction surface 32 of the peristaltic actuating element 30 that are in contact with the body 20 has moved relative the body by the distance 44 compared with FIG. 1A.

Figure 1E:
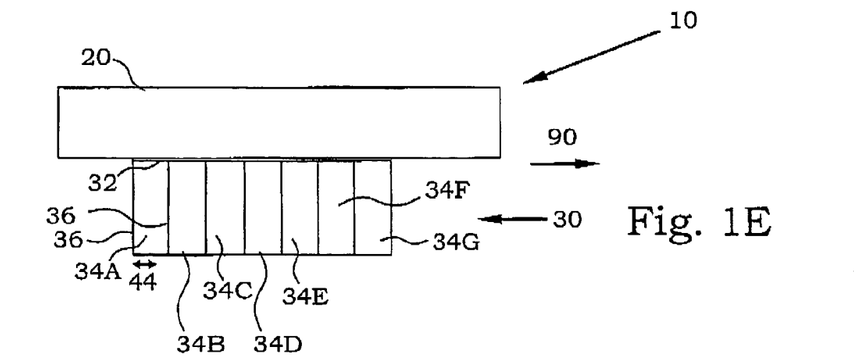

In FIG. 1E, all volumes 34A–G are once more non-excited and in contact with the body 20. The situation is similar to the one in FIG. 1A, but with the difference that the entire peristaltic actuating element 30 has moved relative to the body 20. By keeping the peristaltic actuating element 30 still, the body will move instead.

The motion illustrated by the FIGS. 1A–E is created by causing a portion of the peristaltic actuating element 30 to form a peristaltic section 40 and by moving this section 40 or rather the borders of this section 40 along the peristaltic actuating element 30. This motion of the peristaltic section 40 is caused by a successive excitation of the different volumes 34A–34G of electromechanical material. The peristaltic section 40 of the peristaltic actuating element 30 is thus substantially continuously transferred along the peristaltic actuating element 30. One can for instance notice, that in the present embodiment where the dimension change of the peristaltic actuating element 30 in the main motion direction 90 is an extension, the body 20 will move in the same direction as the peristaltic section 40 moves.

The term "peristaltic" is used to describe the nature of the origin of the motion. In analogy with the use in medical contexts, peristaltic denotes a gradual motion caused by a constriction or enlargement. If evaluating the Burleigh motor disclosed in U.S. Pat. No. 5,751,090, also this can be considered to be a kind of peristaltic motion. However, the motion is there based on a step-wise motion in which the different sections have well defined tasks, and the motion could then be denoted as a discrete peristaltic motion. The present invention is instead based on one continuous body, where a contraction/expansion section propagates. The peristaltic body should hence be designed so that a maximum energy transfer will be made as desired.

The present invention could also be viewed as an expansion/contraction wave propagating through a peristaltic actuating element 30. In that view, there are also similarities with travelling wave motors. However, in a travelling wave motor, the different surface segments of the actuator are brought into a motion along an elliptical path, and the contact points between actuator and body to be moved move in the opposite direction compared with the wave propagation direction. Since the interaction at the contact points is the main motion-creating action, the body to be moved will also travel in this direction. In a travelling-wave actuator, surface segments at the bottom of the wave have a motion component opposite of the main motion direction. In order to achieve an efficient motion it is thus of interest to avoid contacts between surface segments moving in the opposite direction and the body to be moved. The contact area between the actuating element and the body to be moved is therefore typically only a fraction of the entire actuator surface, and at least less than half. Travelling-wave actuators are typically utilizing transversal waves sent through the actuating element.

This invention is in contrary based on a mechanism involving the propagation of a contraction/expansion wave with negligible movement of the contact area between stator and rotor. The motion-free contact of the sections carrying the major part of the load is thus one of the major differences from travelling wave motors. The contraction/expansion wave is basically a longitudinal wave and any motion in the transversal direction is of minor importance. Furthermore, the width of the peristaltic section 40 is preferably small compared with the entire length of the entire peristaltic actuating element 30. In most cases, the peristaltic section 40 covers less than half the peristaltic actuating element 30 length, and preferably much less. The main part of the peristaltic actuating element 30 is always in contact with the body. This makes it possible to reach very high forces with small actuators. Another major difference compared with a travelling-wave motor is this comparably large instant contact area.

The construction of the peristaltic active stator is mainly material dependent. With a material that is both robust and has a large shape change, the need for additional materials and components can be minimized and the volumes of electromechanical material can themselves constitute the dominating part of the peristaltic actuating element. Where the propagation wave travels, there should preferably be no or little contact between the stator and rotor. Since most of the active electromechanical materials have simultaneous contraction and expansion in different directions this can be directly utilized.

Figure 2:
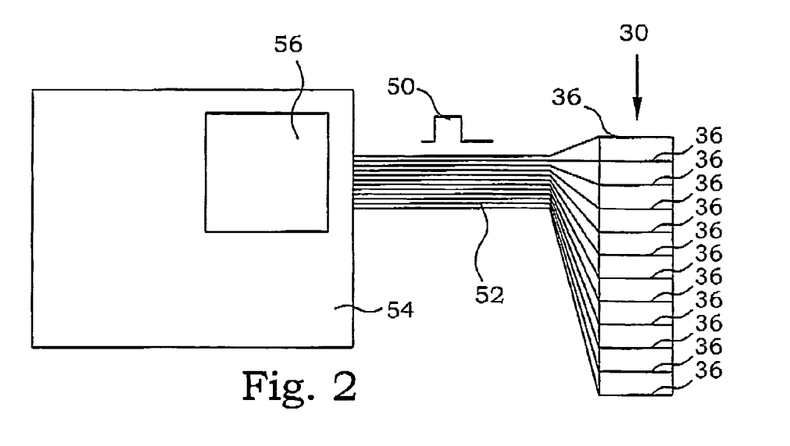
FIG. 2 is a block scheme of an embodiment of an electromechanical actuator device according to the present invention.

FIG. 2 is a block scheme of an embodiment of electronic parts of an electromechanical motor according to the present invention. The peristaltic actuating element 30 is provided with a number of electrodes 36 for enabling electromechanically active volumes in the vicinity. The electrodes 36 are provided with voltage signals 50 from a control means, in this embodiment a voltage drive unit 54, via connectors 52. The voltage control unit 54 determines required voltages for the different electrodes 36 and supplies the requested voltage signals with selected phase differences. The voltage drive unit 54 preferably comprises energy recovering means 56. The energy recovering means 56 is arranged to recover at least a part of the energy released when the voltage over the electromechanically active volumes changes. The energy can either be transferred to another electrode simultaneously charging up, or can be stored to be used at a later stage. Such energy recovering means 56 as such are known in prior art, and are therefore not further discussed.

Figure 3:
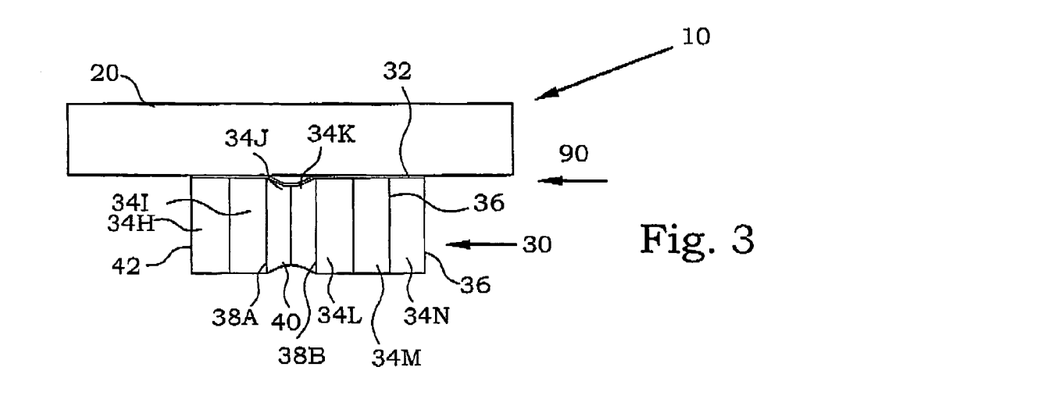
FIG. 3 is a schematic drawing of another embodiment of an actuator according to the present invention.

In FIG. 3, another embodiment of an electromechanical continuous peristaltic motor according to the present invention is illustrated. In this embodiment, the electromechanical material in the volumes 34H–N is such that it will exhibit a contraction in the main motion direction if a voltage is applied across the volumes. A peristaltic section 40 comprises in this embodiment volumes 34L–M contracted in the main motion direction. The basic principles are analogue to FIGS. 1A–E, but the motion direction of the body 20 will be reversed.

Figure 4:
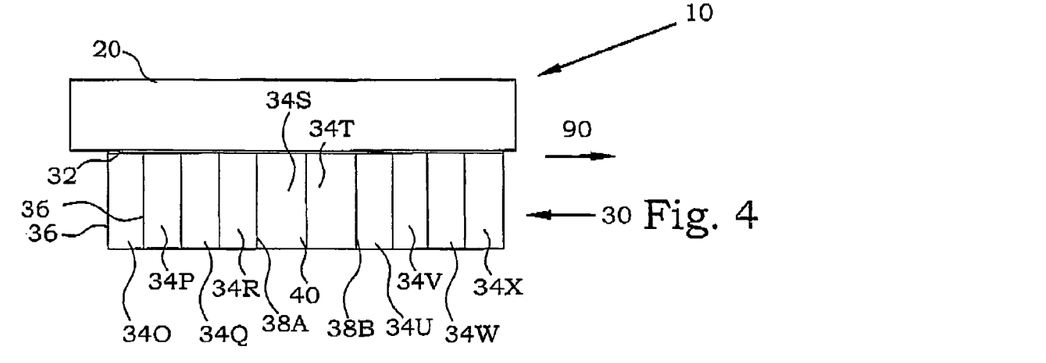
FIG. 4 is a schematic drawing of yet another embodiment of an actuator according to the present invention.

In some applications where efficiency is not the main performance demand, the same pressure on the contraction wave surface and the remaining stator surface can even be accepted. Such a situation is illustrated in FIG. 4. A peristaltic actuating element 30 comprising volumes 34O–X exhibiting a contraction in the main motion direction upon excitation, but essentially no dimension change in the transversal direction. The contraction (in this embodiment) wave area, i.e. the peristaltic section 40 should typically be smaller, preferably much smaller, than the non-contracted stator area 41.

Upon exciting or de-exciting a volume 34O–X, the volume will change its center of gravity position relative the unaffected volumes. Since all volumes are in contact with the body 20, this means that at least one of the changing volumes or the unaffected volumes have to slide with respect to the body surface. Since the area of the peristaltic section 40 is much smaller than the non-contracted stator area 41, the result will be that the peristaltic section 40 slides while the non-contracted stator area 41 remains in static contact with the body 20. A smaller force is applied on the contracted wave area, and the contraction should be sufficient to cause slippage at the contraction wave surface. Also, when the contraction speed is reasonably high in the peristaltic section, the friction coefficient will typically decrease, which improves the situation further. This arrangement will cause a larger wear due to the slippage motion, but at the same time there will be less demands on flatness between stator and rotor/shuttle.

Figure 5:
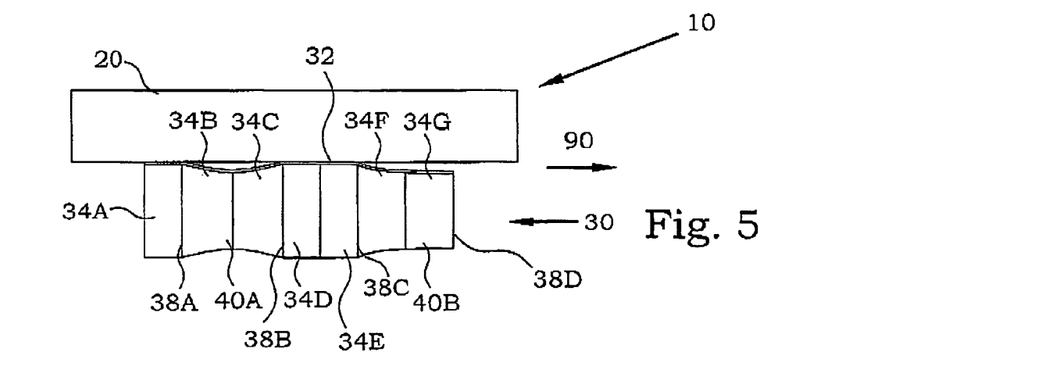
FIG. 5 is a schematic drawing of an embodiment of an actuator according to the present invention operating with more than one simultaneous peristaltic section.

The speed of the relative displacement between the body 20 and the peristaltic actuating element 30 can be varied in different ways. One obvious possibility is to vary the frequency/duration of the voltage signals. Different aspects of this will be discussed further below. Another possibility to adapt the average speed is to vary the intervals between initiations of new peristaltic sections 40. By introducing time periods within which no peristaltic sections 40 at all are present, the average speed is reduced. It is also possible to increase the average speed by initiate a new peristaltic section 40 before the previous one has reached the opposite end of the peristaltic actuating element 30. In other words, more than one peristaltic section 40 can be present simultaneously. Such a situation is illustrated in FIG. 5. Here, a first peristaltic section 40A and a second peristaltic section 40B are present within the peristaltic actuating element 30, having borders 38A, 38B, and 38C, 38D, respectively. Both peristaltic sections 40A, 40B are simultaneously brought along the extension direction of the peristaltic actuating element 30. Anyone skilled in the art realizes from FIG. 5 that any number of peristaltic sections can be used simultaneously, as long as they do not interfere detrimentally on each other. The total area of the peristaltic sections should preferably still be small compared to the entire interaction surface 32.

If the voltage drive circuit is arranged to recover the energy supplied to the actuator material in an efficient manner, also quasi-static peristaltic propagation can be used without a large loss in total energy efficiency. Quasi-static operation is defined as an operational mode where dynamic contributions to the operation essentially can be neglected. Quasi-static operation is often desired when positioning accuracy is of major importance. Furthermore, the optimization is simpler when one only has to consider the static forces in a system. Since the body always is supported by a large fraction of the interaction surface 32, the operation of a motor according to the present invention can be arbitrary slow and may even be stopped at essentially all instances. This is not achievable by using travelling wave mechanisms.

In the previous embodiments, the peristaltic actuating element 30 has been constituted mainly by the electromechanically active volumes themselves. However, in certain applications and for certain choices of electromechanical materials, there might be some additional constraints. If an electromechanical material is selected, that have an insufficient shape change in the direction perpendicular to the interaction surface to fulfil e.g. wear resistance requests, other design concepts have to be employed. Similarly, in e.g. applications where thin stators are needed, other techniques have to be utilized to release the propagating wave from the rotor. One possible simple technique to get a large deformation is to use bending as an internal leverage. Moreover, if one would consider a piezoelectric active material, then a stator made of the piezoceramic material as the continuous body is not always desirable due to the brittleness of the material. In these cases, another more robust material can be used as the continuous material, e.g. metal or polymer, and the piezoceramic material can be used solely for causing the motions.

Figure 6:
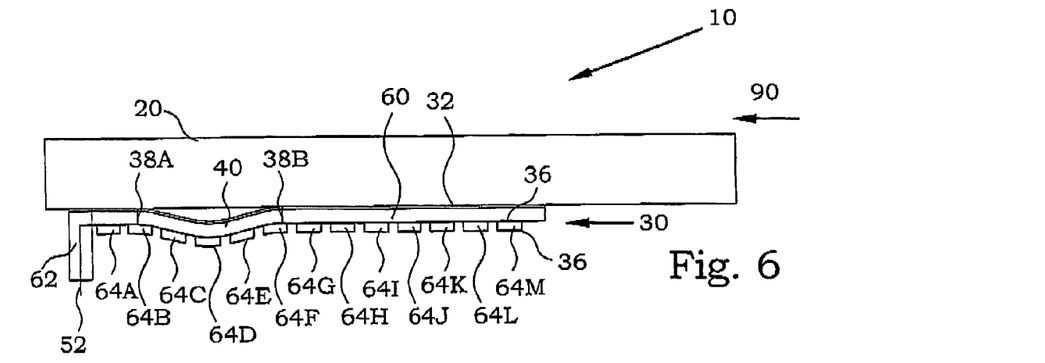
FIG. 6 is a schematic drawing of still another embodiment of an actuator according to the present invention.

In FIG. 6, an embodiment of a continuous peristaltic motor according to the present invention is illustrated. In this embodiment, the peristaltic actuating element 30 comprises a main carrier 60, which in turn comprises the interaction surface 32. The main carrier 60 is attached to a stator portion 62 for mechanical support. At regular positions along the main carrier 60, volumes 64A–M of electromechanically active material are assembled on the main carrier 60. The main carrier 60 provides flexibility in shape that allows for a change in the dimension along the main motion direction as well as a removal of part of the interaction surface from the body 20. In the present embodiment, the main carrier 60 can be bent, creating a bulge, giving rise to a shortening of the total peristaltic actuating element 30 length as well as the removal of the interaction surface 32 from the body 20 within the bulge area. The shortening is partially due to the active material and partially due to the bending itself. The volumes 64A–M are excited by providing electrodes 36 with suitable voltages through connectors 52, and the shape change of the volumes 64A–M causes the main carrier 60 to form e.g. a bulge. A peristaltic section 40 is created.

The operation is similar to previous embodiments. By controlling the voltage signals to the electrodes 36 of the volumes 64A–M, the main carrier can be forced to change its shape and thereby essentially continuously move the borders 38A, B of the peristaltic section 40 along the peristaltic actuating element 30.

Figure 7:
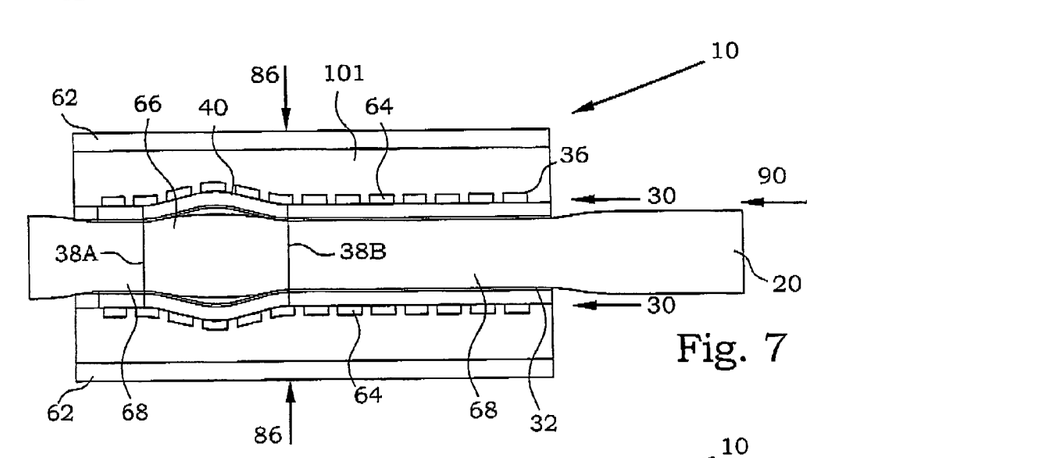
FIG. 7 is a schematic drawing of an embodiment of an actuator according to the present invention having dimension changes the body to be moved.

The rotor/shuttle is normally considered passive and stiff but in some cases, the stator deformation will result in the major movement, FIG. 7. In FIG. 6, the shortening is due to a combination of the active material and the bending itself, neglecting any shortening of the body 20. In FIG. 7, the body 20 has a non-negligible resilience. Typically the normal force is evenly distributed over the stator surface using a resilient material such as silicone rubber 101. A normal force 86 is applied to the stator portions 62 and the pressure at the interaction surface 32 will cause shrinkage in thickness of the resilient body. Most materials deform with small volume changes and therefore there will be a longitudinal expansion of the body 20 where the pressure is applied. The relative longitudinal length change of the body 20 between a section 66 corresponding to the peristaltic section 40 of the stator 30 and pressurized sections 68 will for certain combinations of stators/body dominate and will therefore be the major reason for movement when the peristaltic section 40 moves.

Figure 8:
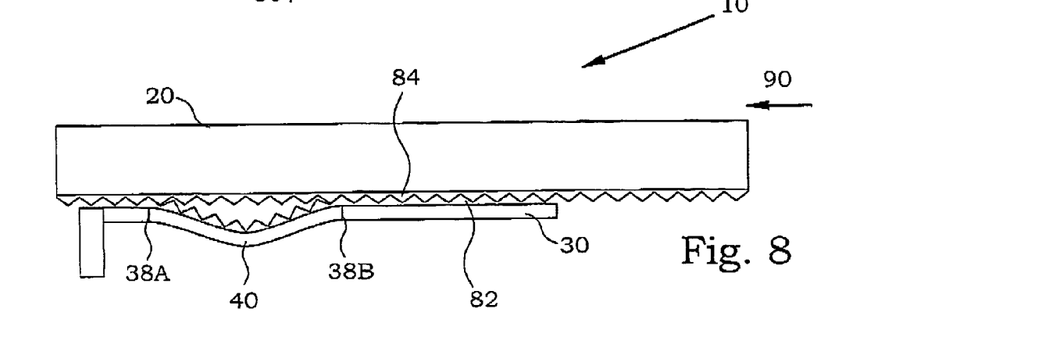
FIG. 8 is a schematic drawing of an embodiment of an actuator according to the present invention having teeth.

In certain applications where very large forces, the friction between stator and rotor might not be large enough to prohibit slippage between rotor and stator. If exact positioning is further required, also the interaction surfaces of rotor/body and stator have to be considered. FIG. 8 shows a possible solution. The interaction surface 32 of the peristaltic actuating element 30 is provided with geometrical structures, in this embodiment in the form of stator teeth 82. Similarly, an interaction surface the body 20 to be moved is provided with geometrical structures 84 of a shape complementary to the geometrical structures 82. (Electromechanical volumes are not shown in this figure.) In this embodiment, the geometrical structures 84 are also triangularly shaped teeth. The peristaltic actuating element 30 is forced to be released from the body 20 within the peristaltic section 40, and the stator teeth 82 can be brought into interaction with a new body tooth 84, when again approaching the body 20. The forces parallel to the main motion direction 90 can in such an embodiment be considerably higher than in embodiments based on flat interaction surfaces. In this particular embodiment, there is no need for a dimension change of the peristaltic actuating element in the main motion direction, since teeth are used. An orthogonal dimension change will instead be sufficient, provided that there is a difference in number of teeth in rotor and stator, respectively.

A relative dimension change, i.e. a change in dimension difference between the peristaltic actuating element 30 and the body 20, can therefore have components in either of a direction parallel to the main motion direction or of a direction orthogonal or perpendicular to the main motion direction, or in both.

The number of teeth 82, 84 in the body 20 and stator 30 is important from many points of view. The relative difference in number of teeth can be used to control the gear ratio between applied frequency and body frequency or speed. For example, if one cycle of the applied voltage signal corresponds to one full turn of the peristaltic section, then the gear ratio $1/H=(N_r-N_s)/N_s$, where $N_r$ is the number of teeth in the body 20 and $N_s$ the number of teeth in the stator 30, gives the gear down of the body 20. Without teeth there is already a gear down effect and one solution is to use the same ratio when bodies and stators have teeth. Another solution is to have a higher gear ratio (i.e. lower H) to increase speed, while the friction in the teeth will increase. To minimize friction, heating and wear a lower gear ratio can be used. The motor force will then increase.

Figure 9:
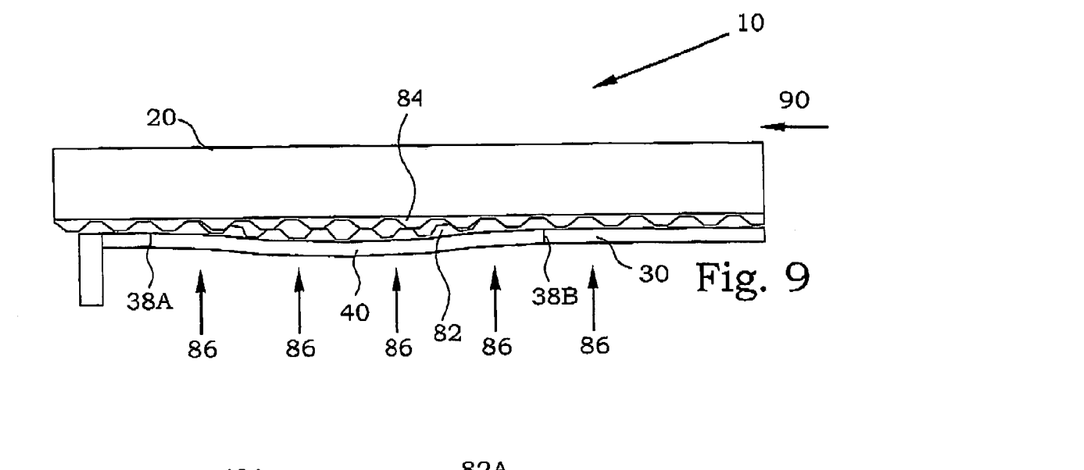
FIG. 9 is a schematic drawing of another embodiment of an actuator according to the present invention having teeth.

Geometrical structures of the interaction surfaces can also be used for other purposes. FIG. 9 shows an embodiment with a tooth geometry of stator teeth 82 and body teeth 84 that makes it possible to move a peristaltic section without the need for any orthogonal shape change. The teeth length of the stator in the peristaltic section is typically different than the teeth length of the rotor and with flattened teeth there will be no gripping in the peristaltic section. The movement of the peristaltic section will make the body move and a high tangential force is maintained by the other teeth that are interlocked. Naturally the opposite could also be used, i.e. the teeth length in the peristaltic section will be equal to the body teeth length. Another advantage is a locking of the body when any voltage to the electromechanical volumes is turned off. By letting the normal force, illustrated by the arrows 86, be created by an extended load, the peristaltic actuating element 30 will be adjusted according to the body and only where the teeth 82, 84 agree, they will lock. A fine positioning can thus be performed, and when the required position is reached, all voltages can be turned off, while the relative position between stator and body remains in the required position.

Figure 10:
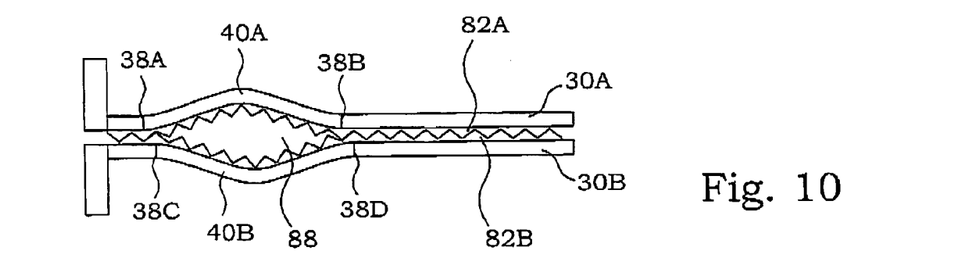
FIG. 10 is a schematic drawing of an embodiment of a peristaltic pump according to the present invention.

The main advantages occur in applications where a solid state body is going to be moved. However, peristaltic actuating elements according to the present invention can also be used for pumping a liquor or gas. FIG. 10 illustrates two peristaltic actuating elements 30A, 30B pressed together by a normal force 86. Both peristaltic actuating elements 30A, 30B are provided with stator teeth 82A, 823 having high accuracy in the teeth surfaces. By moving a respective peristaltic section 40C, 40D having borders 38A–D along each peristaltic actuating element 30A, B a volume 88 that will move will be created between peristaltic actuating elements 30A, B. If this volume is arranged to comprise a liquor or gas a peristaltic pump is created.

Figure 11:
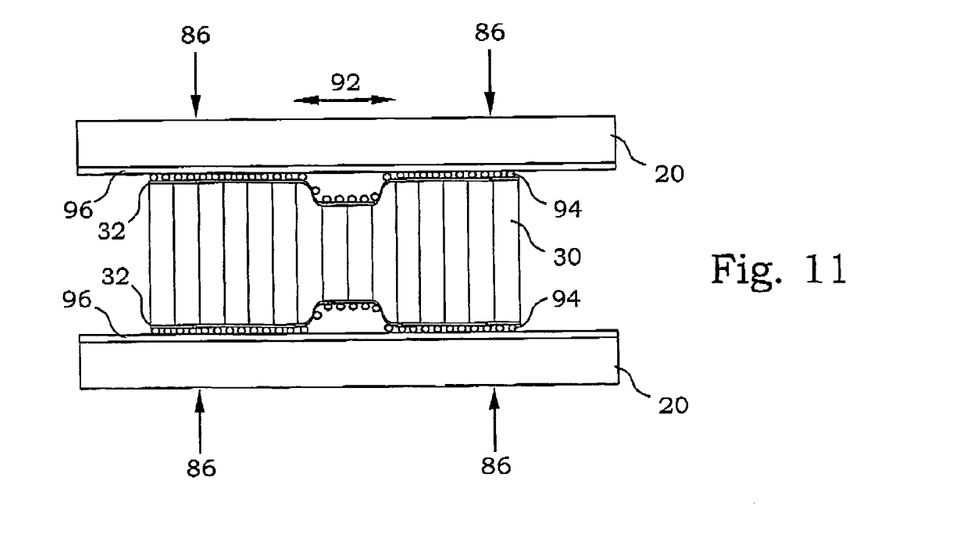
FIG. 11 is a schematic drawing of an embodiment of an actuator according to the present invention having a central stator.

FIG. 11 shows a preferred embodiment for applications with a need for very large forces and at the same time with high wear resistance. The peristaltic actuating element 30 consists of volumes of laying-down d33-actuators. The crosscontraction/expansion is used to create the peristaltic function in analogy with FIG. 1A–E. In this embodiment, the body 20 to be moved is arranged at both sides of the peristaltic actuating element 30. The peristaltic actuating element 30 thereby has one interaction surface 32 at each side. A peristaltic section 40 with a short peristaltic distance 92 allows for very large normal forces 86. Most wear resistant materials are very stiff in comparison with e.g. piezoceramic materials. A continuous wear resistant layer would therefore limit the expansion of the stator in the longitudinal direction. In order not to limit the movability in the longitudinal direction of the peristaltic actuating element 30, aluminum oxide fibers 94 can be placed across the expansion direction on the peristaltic actuating element 30. The body 20 preferably comprises of a stiff wear-resistant layer 96 with which the peristaltic actuating element 30 interacts.

Figure 12:
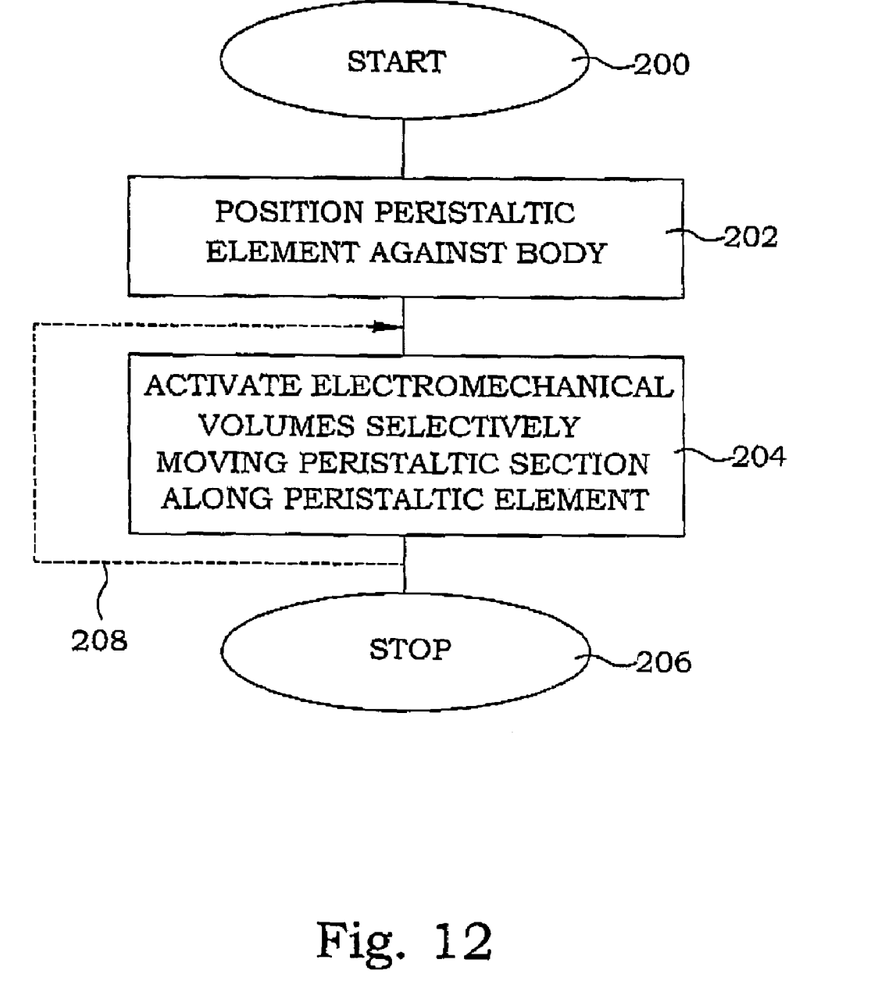
FIG. 12 is a flow diagram of an embodiment of a method according to the present invention.

FIG. 12 is a flow diagram illustrating the main steps in an embodiment of a driving method according to the present invention. The procedure starts in step 200. In step 202 a peristaltic actuating element is positioned against a body. The peristaltic actuating element has electromechanical volumes arranged for locally changing the dimension of the peristaltic actuating element when activated. The electromechanical volumes are selectively activated in step 204 for moving a peristaltic section substantially continuously along the peristaltic actuating element. During this step, the peristaltic actuating element remains in non-sliding contact with the body by sections of the peristaltic actuating element outside the peristaltic section. The procedure ends in step 206. Preferably, the procedure is repeated as indicated by the broken arrow 208.

It will be understood by those skilled in the art that various modifications and changes may be made to the embodiments of present invention presented in the present disclosure without departure from the scope of the invention, which is solely defied by the appended claims.

REFERENCES

M. Bexell and S. Johansson, "Fabrication and evaluation of a piezoelectric miniature motor", Sensors & Actuators A75 (1999), pp. 8–16.

U.S. Pat. No. 3,902,084
U.S. Pat. No. 4,504,760
U.S. Pat. No. 5,751,090
U.S. Pat. No. 6,337,532
U.S. Pat. No. 6,437,485

The invention claimed is:

1. Piezoelectric actuator, comprising:
   a body;
   a peristaltic actuating element, extended in a main motion direction;
   the peristaltic actuating element in turn comprising:
   an interaction surface with the body;
   volumes of piezoelectric material;
   electrodes for excitation of the volumes of piezoelectric material;
   means providing normal forces between said body and said peristaltic actuating element; and
   control means for supplying voltage signals to the electrodes;
   the volumes of piezoelectric material and the electrodes being arranged to cause the peristaltic actuating element to change a dimension difference between the peristaltic actuating element and the body,
   the control means being arranged to supply voltage signals causing borders of a peristaltic section within which the dimension change is present to move substantially continuously along the peristaltic actuating element parallel to the main motion direction,
   the change of the dimension difference between the peristaltic actuating element and the body having a component in a dimension essentially parallel to the main motion direction, and the volumes of piezoelectric material and the electrodes being arranged to further cause the interaction surface within the peristaltic section to be removed from the body to be moved within the peristaltic section simultaneously as the change in dimension difference parallel to the main motion direction.

2. Piezoelectric actuator according to claim 1, wherein the change of the dimension difference between the peristaltic actuating element and the body has a component in a dimension essentially orthogonal to the main motion direction.

3. Piezoelectric actuator according to claim 1, wherein the length of the peristaltic section is less than half an entire length of the peristaltic actuating element.

4. Piezoelectric actuator according to claim 3, wherein the length of the peristaltic section is considerably less than half the entire length of the peristaltic actuating element.

5. Piezoelectric actuator according to claim 1, wherein the change of dimension difference along the main motion direction is caused by a contraction of the peristaltic section.

6. Piezoelectric actuator according to claim 1, wherein the change of dimension difference along the main motion direction is caused by an expansion of the peristaltic section.

7. Piezoelectric actuator according to claim 1, wherein the volumes themselves constitute the dominating part of the peristaltic actuating element.

8. Piezoelectric actuator according to claim 1, wherein the peristaltic actuating element in turn comprises a continuous body of elastic material to which the at least one volume of piezoelectric material is attached.

9. Piezoelectric actuator according to claim 1, wherein a contraction of the peristaltic actuating element perpendicular to the main motion direction causes the interaction surface within the peristaltic section to be removed from the body.

10. Piezoelectric actuator according to claim 1, wherein a bending of the peristaltic actuating element perpendicular to the main motion direction causes the interaction surface within the peristaltic section to be removed from the body.

11. Piezoelectric actuator according to claim 1, wherein the interaction surface is a continuous interaction surface along substantially the entire peristaltic actuating element in the main motion direction.

12. Piezoelectric actuator according to claim 1, wherein the interaction surface is a sectioned interaction surface, whereby the interaction surface sections being dispersed along substantially the entire peristaltic actuating element in the main motion direction.

13. Piezoelectric actuator according to claim 1, wherein the interaction surface comprises first geometrical structures and the body to be moved comprises second geometrical structures, whereby the first and second geometrical structures are shape complementary.

14. Method of driving a peristaltic actuator, comprising the steps of:
positioning a peristaltic actuating element against a body, the peristaltic element having piezoelectric volumes arranged for locally changing a dimension difference between the peristaltic actuating element and the body when activated;
providing normal forces between said body and said peristaltic actuating element;
selectively activating the piezoelectric volumes for moving a peristaltic section in which the dimension change is present substantially continuously along the peristaltic actuating element parallel to a first direction;
whereby the peristaltic actuating element remaining in non-sliding contact with the body by sections of the peristaltic element outside the peristaltic section,
wherein the change of the dimension difference between the peristaltic actuating element and the body has a component in a dimension essentially parallel to the first direction, and
removing the interaction surface within the peristaltic section from the body to be moved simultaneously as the change in dimension difference parallel to the main motion direction.

15. Method according to claim 14, wherein the change of the dimension difference between the peristaltic actuating element and the body has a component in a dimension essentially orthogonal to the first direction.

16. Method according to claim 14, wherein said change in dimension difference is caused by an expansion of the peristaltic actuating element.

17. Method according to claim 14, wherein said change in dimension difference is caused by a contraction of the peristaltic actuating element.

18. Method according to claim 14, further comprising the step of:
imposing a dimension change of the peristaltic actuating element within the peristaltic section in a second direction, different from the first direction, simultaneously as the step of causing the dimension difference change.

19. Method according to claim 18, wherein said dimension change in the second direction is a contraction.

20. Method according to claim 14 wherein the length of the peristaltic section is less than half an entire length of the peristaltic actuating element.

21. Method according to claim 20, wherein the length of the peristaltic section is considerably less than half the entire length of the peristaltic actuating element.

22. Peristaltic actuating element, extended in a first direction, comprising:
interaction surface with an interaction body;
at least one volume of piezoelectric material;
electrodes for excitation of the at least one volume of piezoelectric material;
means providing normal forces between said peristaltic actuating element and said interaction body; and
control means for supplying voltage signals to the electrodes;
the at least one volume of piezoelectric material and the electrodes being arranged to cause a peristaltic section of the peristaltic actuating element to change a dimension difference between the peristaltic actuating element and the interaction body and to simultaneously cause the interaction surface within the peristaltic section to be removed from the interaction body;
the control means being arranged to supply voltage signals causing the at least one volume of piezoelectric material to move borders of the peristaltic section substantially continuously along the peristaltic actuating element in the first direction,
the change of the dimension difference between the peristaltic actuating element and the body having a component in a dimension essentially parallel to the first motion direction, and
the at least one volume of piezoelectric material and the electrodes being arranged to further cause the interaction surface within the peristaltic section to be removed from the body to be moved within the peristaltic section simultaneously as the change in dimension difference parallel to the main motion direction.

23. Peristaltic actuating element according to claim 22, wherein the interaction body is another peristaltic actuating element.

* * * * *